United States Patent [19]
Martin et al.

[11] Patent Number: 4,567,410
[45] Date of Patent: Jan. 28, 1986

[54] CAPACITIVE ARTICLE DENSITY MONITOR

[75] Inventors: Ralph E. Martin, Oak Lawn; Heino Puidak, Hoffman Estates, both of Ill.

[73] Assignee: Continental Can Company, Inc., Stamford, Conn.

[21] Appl. No.: 677,411

[22] Filed: Dec. 3, 1984

[51] Int. Cl.⁴ .................. H02P 5/00; B65G 43/00
[52] U.S. Cl. .................... 318/332; 318/341; 318/662; 318/652; 318/646; 324/61 R; 198/341; 340/870.37
[58] Field of Search ............... 318/662, 332, 341, 644, 318/646, 652, 656, 657, 671, 599; 198/340, 341, 356, 358, 464, 469, 525, 524, 526, 529, 571, 562, 572, 573, 577, 639, 854, 855, 856, 857, 858, 859; 414/294, 299, 293; 340/870.39, 870.37, 676; 324/130, 61 R, 158 F

[56] References Cited
U.S. PATENT DOCUMENTS

| 3,684,961 | 8/1972 | Muir | 318/656 X |
| 3,857,092 | 12/1974 | Meyer | 318/662 X |
| 4,158,171 | 6/1979 | Abbe et al. | 318/662 X |
| 4,323,829 | 4/1982 | Witney et al. | 318/662 X |
| 4,394,896 | 7/1983 | McComas et al. | 198/572 X |
| 4,423,417 | 12/1983 | Tanaka et al. | 340/870.37 |
| 4,437,055 | 3/1984 | Meyer | 324/61 R |
| 4,459,702 | 7/1984 | Medwin | 324/61 R X |
| 4,504,832 | 3/1985 | Conte | 340/870.37 |

Primary Examiner—William M. Shoop, Jr.
Assistant Examiner—Shik Luen Paul Ip
Attorney, Agent, or Firm—Charles E. Brown

[57] ABSTRACT

A capacitance article density monitor which is adjusted to have a zero voltage output when no articles are positioned adjacent a sensor and wherein the output of the circuit may be utilized directly to control a variable speed drive for a machine to which articles are being directed depending upon the density of such articles in a conveying area in advance of the machine. This abstract forms no part of the specification of this application and is not to be construed as limiting the claims of the application.

22 Claims, 10 Drawing Figures

CAPACITIVE ARTICLE DENSITY MONITOR

This invention relates in general to new and useful improvements in density monitors, and more particularly to a capacitive article density monitor which may be utilized to control the speed of a machine. In the environment of the invention, containers (metal cans) are supplied to a machine which will perform a function on the containers. In the past, machines have been started and stopped in accordance with the supply of articles. In accordance with this invention, it is proposed to provide a density monitor which will have an output that can be utilized in conjunction with a variable speed drive so as to vary the speed of the machine in accordance with the backlog of articles and wherein starting and stopping of the machine is eliminated.

Most particularly, the invention relates to an elongated sensor which is mounted in a position underlying the path of containers rolling toward a machine and wherein the change in the capacitance of the sensor due to a variation in the number of associated containers will be converted to a voltage output which may then be suitably converted to control a machine drive mechanism.

With the above and other objects in view that will hereinafter appear, the nature of the invention will be more clearly understood by reference to the following detailed descripiton, the appended claims, and the several views illustrated in the accompanying drawings.

IN THE DRAWINGS

Figure 1:
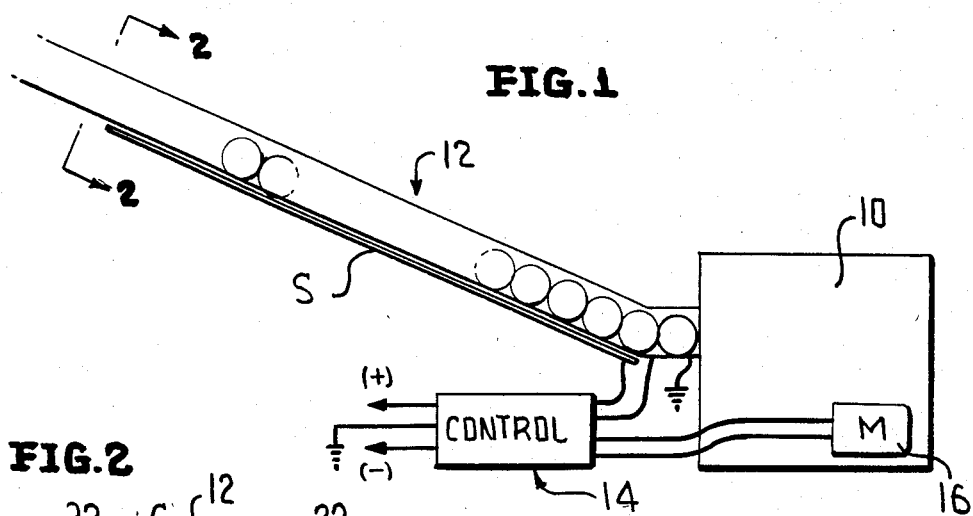
FIG. 1 is a schematic elevational view showing containers being delivered to a machine by means of a conveyor chute with there being associated with the conveyor chute a density monitor which controls the speed of operation of the machine.

In FIG. 1 there is illustrated a typical environment for the invention. A machine 10, which may be a flanging machine, is supplied with metal cans C by gravity through a conveyor chute 12. The conveyor chute 12, in a manner to be described hereinafter, has associated therewith a sensor S to which there is coupled a control circuit generally identified by the numeral 14. The control circuit 14 is coupled, for example, to a variable speed motor 16 of the machine 10. It is to be understood, however, that the machine 10 may have another type of variable speed drive which may be controlled electrically.

In accordance with this invention, the sensor S senses the backlog of containers C awaiting operation thereon by the machine 10 and, depending upon the backlog, varies the speed of operation of the machine 10. In accordance with this invention, it is preferred that the machine 10 have a minimum speed and that when there are no or substantially no containers awaiting operation thereon by the machine 10, the machine will continue to operate at that minimum speed. As the backlog of containers increases, the speed of operation of the machine 10 will likewise be increased.

Figure 2:
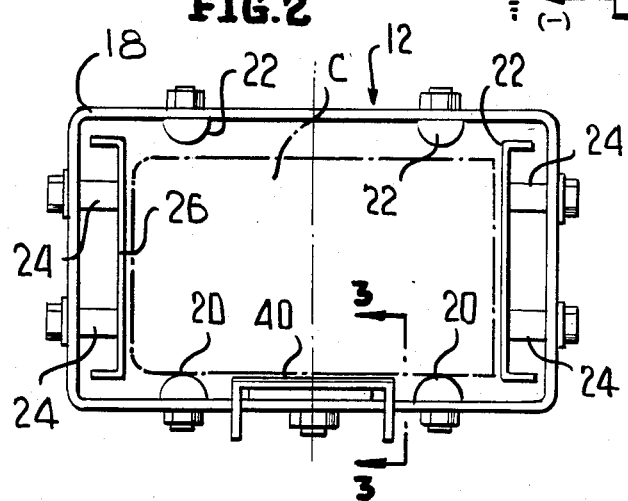
FIG. 2 is an enlarged fragmentary sectional view taken through the conveyor chute along the line 2—2 of FIG. 1, and shows the specifics thereof.

While the sensor S may take various forms, it has been found that the simplest form of sensor is a long length of aluminum channel which is mounted in the lower part of the conveyor chute 12. With particular reference to FIG. 2, it will be seen that the conveyor chute 12 includes a plurality of longitudinally spaced collars 18 which are joined together by pairs of lower rails 20 and upper rails 22. The collars are also joined together by rails 24 which connect together upright portions of the collars 18. The rails 24 serve both as spacers and supports for guide members 26 at opposite ends of containers C as is clearly shown in FIG. 2.

Figure 3:
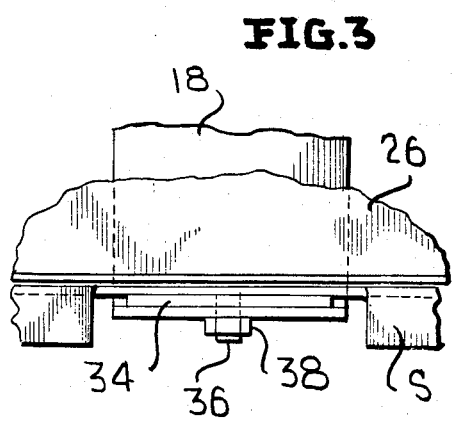
FIG. 3 is an enlarged fragmentary vertical sectional view taken generally along the line 3—3 of FIG. 2, and shows the mounting of the sensor.

The channel shaped sensor S includes a web 28 and depending flanges 30. The flanges 30 are provided with notches 32 at spaced intervals in accordance with the spacing of the collars 18. The web overlies the bottom parts of the collars 18 and are spaced therefrom by an insulator 34 as is best shown in FIG. 3. An insulated fastener 36 (Nylon) extends down through the web 28, the spacers 24 and the bottom part of the collar 18 and is provided with an insulated (Nylon) nut 38.

As is clearly shown in FIG. 2, the web 28 is spaced below the path of the containers C. It is preferred that the web 28 have a covering of tape 40 to prevent metal-to-metal contact between the containers C and the sensor S.

Figure 4:
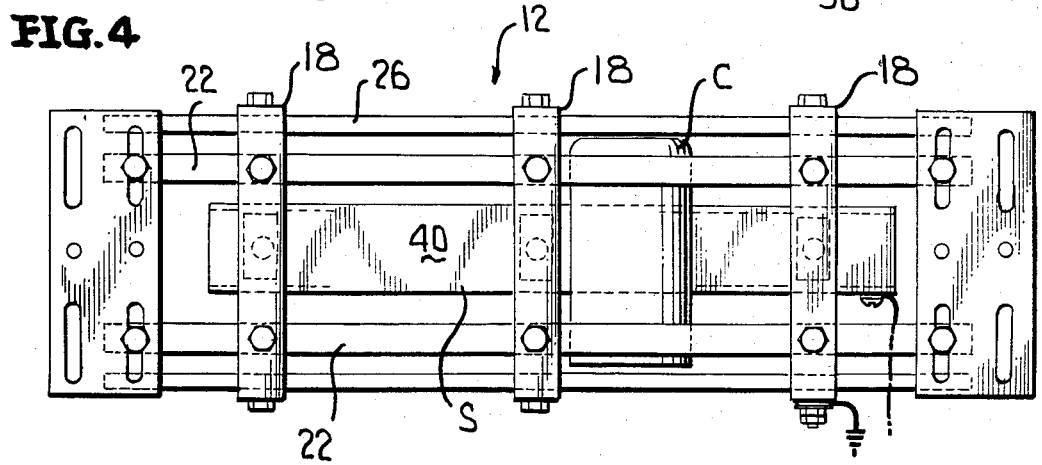
FIG. 4 is a fragmentary bottom plan view of the conveyor chute of FIG. 2, and shows further details of the mounting of the sensor.
Figure 5:
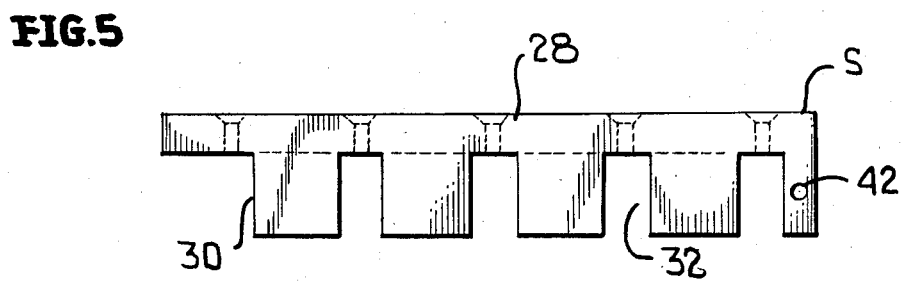
FIG. 5 is an enlarged elevational view of the sensor with parts broken away, and shows further the details of the sensor.

With reference to FIGS. 4 and 5, it will be seen that the sensor S has formed in the flange thereof adjacent one end a tapped hole 42 which is utilized to secure a sensor wire to the sensor. A ground wire will be attached to the adjacent collar.

Figure 6:
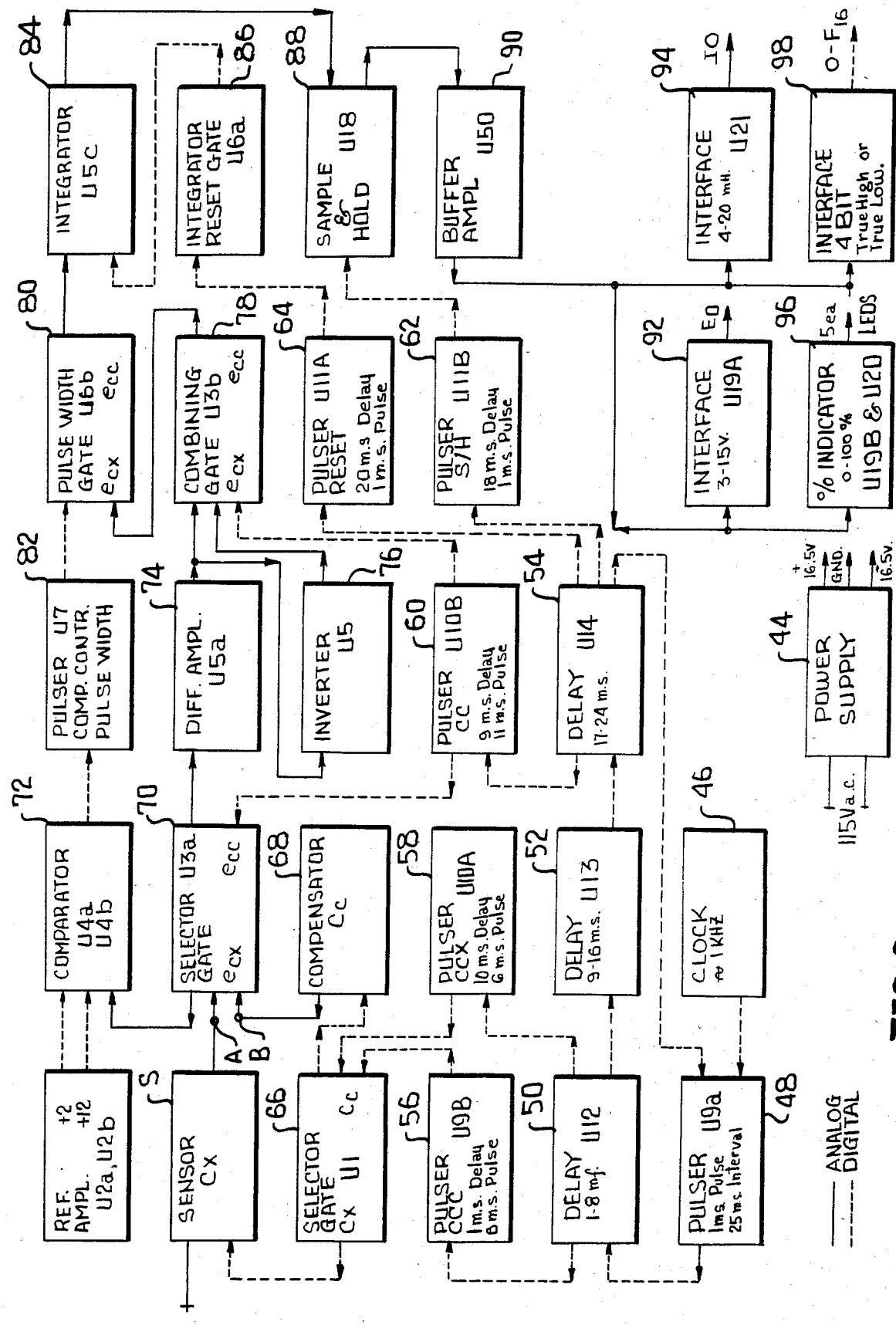
FIG. 6 is a block diagram of the control system of the density monitor.
Figure 7A:
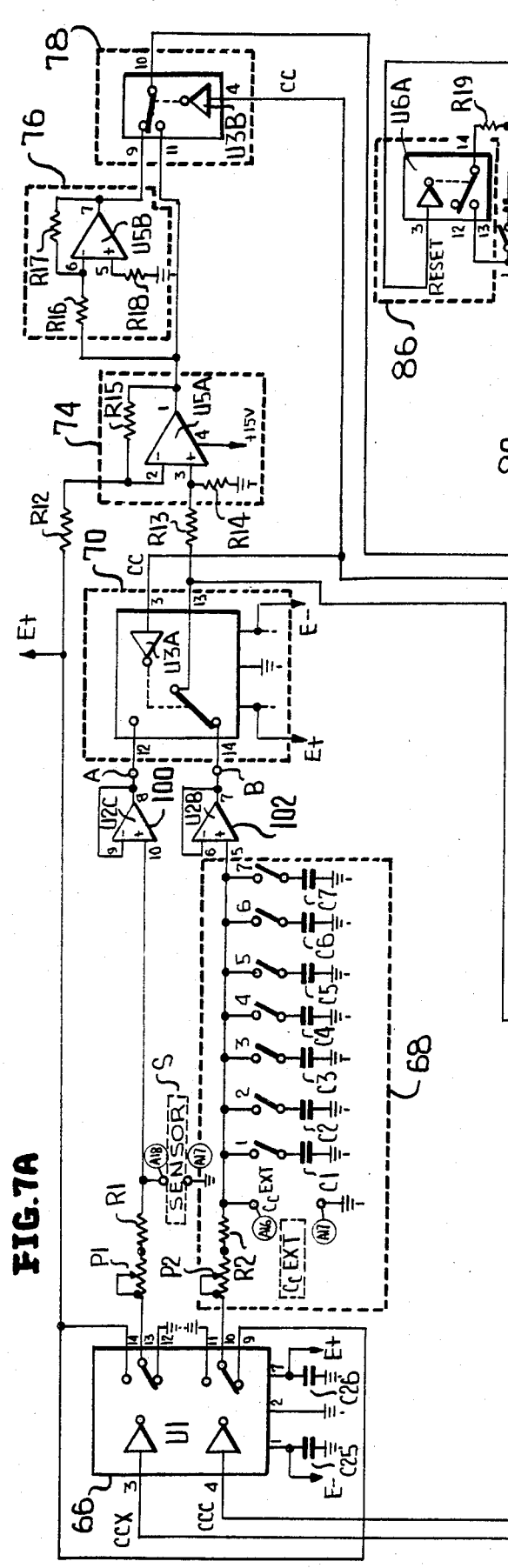
FIGS. 7A–7C is a wiring schematic of the density monitor.
Figure 7A:
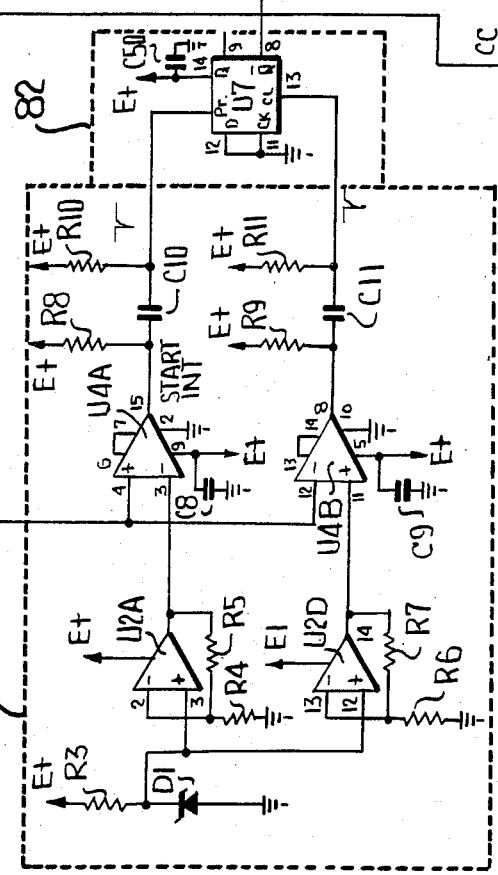
Figure 7B:
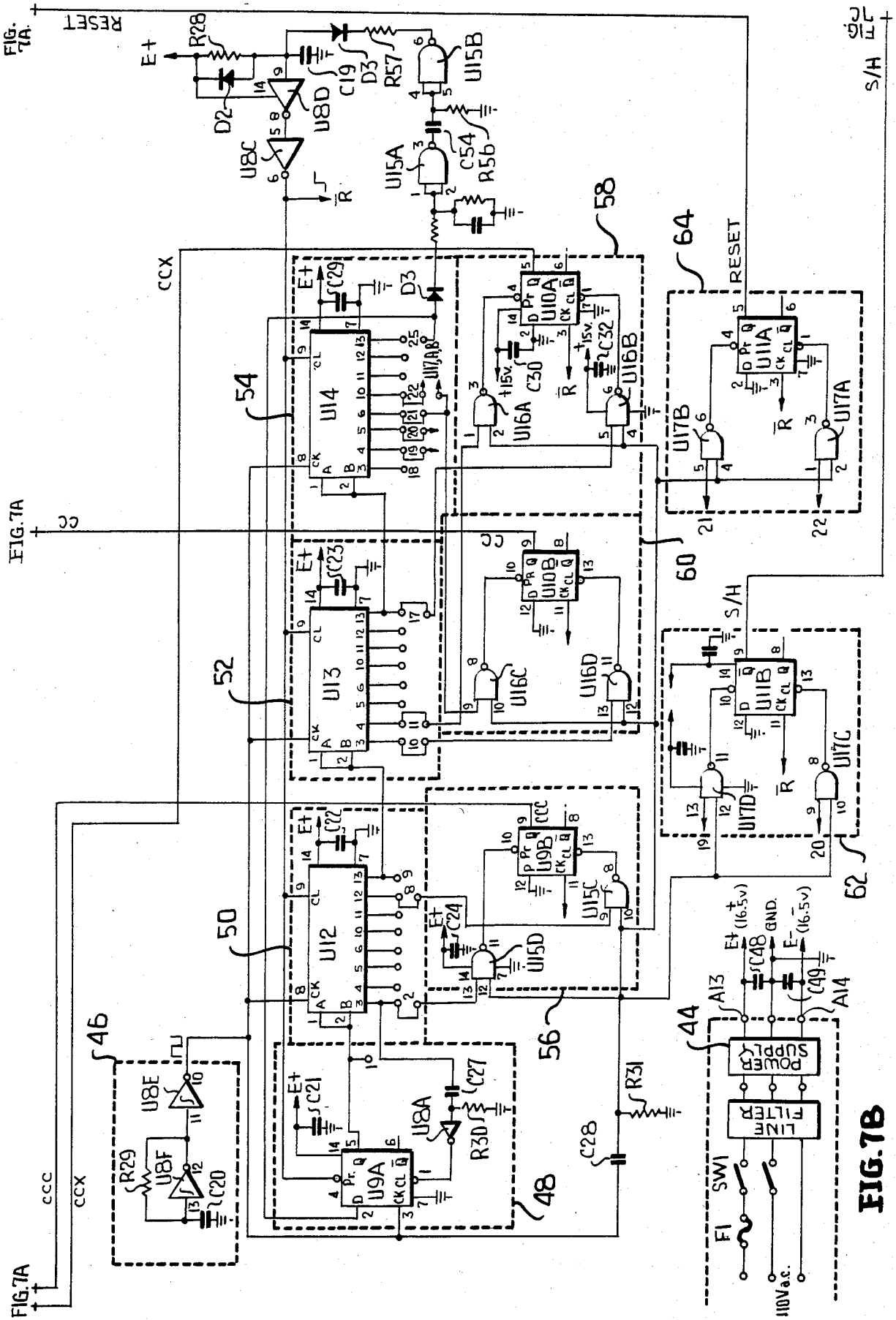
Figure 7C:
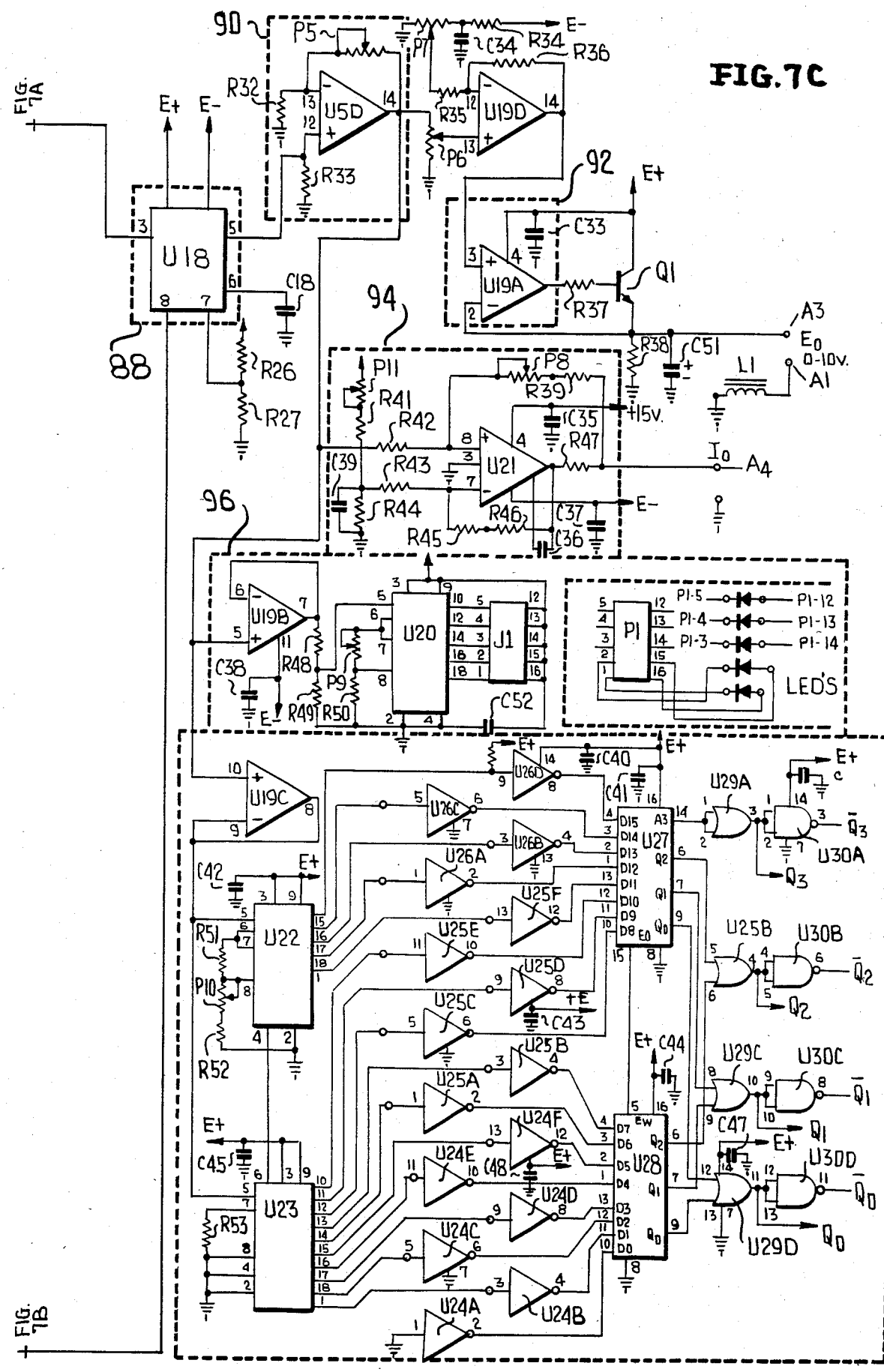

Reference is now made to FIG. 6 which is a block diagram showing generally the details of the control 16.

First of all, there is a power supply 44 which utilizes a 115 volt A.C. source. The power supply has a three wire output including a positive, a ground, and a negative. The output is preferably 16.5 volts.

The control is provided with a pulsed control system which includes a 1 khz clock 46 which is coupled to a shift register which includes a pulser 48 and delays 50, 52 and 54. The pulser provides for a 1 ms pulse at a 25 ms interval.

The delay 50 is a 1–8 ms delay, the delay 52 is a 9–16 delay, and the delay 54 is a 17–24 ms delay.

The delays 50, 52 and 54 are coupled in series with the delay 54 being also coupled to the pulser 48.

There are four additional pulsers including pulser 56 having a control designation ccc. The pulser 56 is coupled to the delay 50 and has a 1 ms delay and a 6 ms pulse.

The next pulser is identified by the numeral 58 and has an output signal designated as ccx. The pulser 58 is also coupled to the delay 50 and provides at an 10 ms delay a 6 ms pulse.

A third pulser, identified by the numeral 60, has a control pulse identified as cc and is coupled to the delay 54. The pulser 60 provides at a 9 ms delay an 11 ms pulse.

A fourth pulser 62 which is an S/H (sample and hold) pulser, is coupled to the delay 54. The signal from the pulser 62 is designated as S/H, and at an 18 ms delay provides a 1 ms pulse.

A fifth pulser 64 is a reset pulser and has a control signal designated as RESET. The pulser 64 is also coupled to the delay 54 and at a 20 ms delay provides a 1 ms pulse.

A selector gate 66 receives signals from the pulsers 56, 58 and selectively connects the pulse ccc with the sensor S and the pulse ccx with a compensator 68. The compensator 68, as will be illustrated and described hereinafter, includes a bank of capacitors which permit separate capacitors to be selected and incorporated in the system.

The sensor S and the compensator circuit 68 are coupled to a selector gate 70 which, depending upon its position, timely couples the output of either sensor S or the compensator 68 to a comparator 72. The selector gate 70 is controlled by a pulse from the pulser 60. The selector gate 70 also selectively couples the sensor S or the compensator 68 to a differential amplifier 74.

The output of the differential amplifier 74 is coupled to an inverter 76. The output of the differential amplifier 74 and that of the inverter 76 are selectively coupled by way of a combining gate 78 to a pulse width gate 80. The combining gate position is controlled by a pulse cc from the pulser 60.

The output of the comparator 72 is also coupled to the pulse width gate 80 through a pulser 82 which controls pulse width in accordance with the output of the comparator 72.

The output of the pulse width gate 80 is directed to an integrator 84 which is controlled by a reset gate 86 which, in turn, is reset as a result of the RESET signal received from the pulser 64. The output of the integrator 84 is directed to a sample and hold device 88 which is controlled by the S/H control pulse from the pulser 62. The output of the sample and hold device 88 is varied in accordance with the density of containers as determined by the sensor S.

At this time it is pointed out that when the density monitor is first set up the voltage of the output of the sample and hold device 88 will be checked, and normally this will be a negative voltage. The required capacitors of the compensator 68 are incorporated in the circuit so that the voltage of the output of the sample and hold device 88 becomes zero. It is to be understood that this setting of the compensator occurs when there are no containers adjacent the sensor S.

While the output of the sample and hold device 88 may be utilized directly as a control for controlling the speed of operation of the machine to which containers are being delivered, there are provided several types of controls which may be selectively used. First, the output of the sample and hold device 88 is directed to a buffer amplifier 90 and then is directed to four control units. These control units include a voltage interface 92 which has an output normally varying from 5 to 15 volts depending upon the density of the containers sensed by the sensor S. Although the voltage output may be zero, it is preferred that there always be a minimal voltage so that the machine being controlled will always run at a preselected minimum speed. For example, the machine 10 may have an operating range of from 300 to 900 operations per minute and when the sensor S senses that there are no containers available for operation on by the machine, the machine will run at the preselected minimum speed as opposed to stopping. Should it be desired that the machine be permitted to stop, then the voltage of the voltage interface 92 will be permitted to drop to zero.

The controls also include an amperage interface 94 which depending upon the density of containers sensed by the sensor S will have an output of 4–20 mA. The output of the interface 94 will similarly control the speed of operation of the machine 10.

There is also provided a percentage indicator 96 which will provide an output in accordance with the sensed density of containers relative to the sensor S. The indicator 96 will be coupled to a preselected number of LEDs, such as five.

Finally, there is a four bit interface 98 which instead of providing for an unlimited variation in machine speed, will provide for sixteen preselected speeds.

Reference is next generally made to the circuit diagram of FIG. 7. It will be seen that the various components of the system as set forth in the block diagram of FIG. 6 are set forth in the circuit diagram by way of dash-dot boxes and in association with the block diagram is, for all practical purposes, self-explanatory. However, several features will be pointed out here.

First, it will be seen that the selector gate 66 is divined by two separate analog switches, one of which is controlled by the pulse ccx and the other of which is controlled by the pulse ccc. The switch controlled by the pulse ccx normally connects the sensor S to ground, but when energized connects the sensor S to the power supply.

In a like manner, the switch controlled by the pulse ccc normally connects the compensator 68 to the power supply, but when activated connects the compensator to ground.

With respect to the details of the compensator, it will be seen that it includes a plurality of capacitors of different capacities, and each capacitor is provided with its own switch so as selectively to connect that capacitor into the circuitry. It will be seen that the capacity of the various capacitors will be so selected wherein the desired compensated capacitance may be incorporated in the system.

At this time it is pointed out that the circuitry from the sensor S to the selector gate 70 is provided with a buffer amplifier 100 while a similar buffer amplifier 102 is incorporated in the circuitry from the bank of capacitors to the same selector gate 70.

It will be seen that the selector gate 70 is also in the form of an analog switch which is controlled by the pulse cc and in its normal position connects the compensator 68 to the differential amplifier 74. However, when the switch is actuated by way of a pulse cc, the switch then couples the sensor circuit to the differential amplifier.

The output from the differential amplifier goes both directly to the combining gate 78 and to the inverter 76 with the normal position of the combining gate 78 being coupled to the inverter 76. When the analog switch of the combining gate 78 is energized by the pulse cc, the switch serves to couple the differential amplifier 74 directly to the pulse width gate 80.

It is also to be noted that the pulse width gate 80 is an analog switch and the same is true with respect to the integrator reset gate 86.

It is to be understood that in selecting the capacitors of the compensator 68 with there being no containers in the system, a test voltage is taken in the line extending between the integrator 84 and the sample and hold device 88. When the capacitance of the circuit is properly adjusted, the voltage should be zero. If the voltage is negative, then selected ones of the capacitors of the bank of capacitors of the compensator are coupled into the circuit until the voltage becomes zero.

With respect to the voltage interface 92, it is to be understood that the control voltage $E_O$ from that interface will be varied to provide for a positive voltage output even when the true voltage input is zero, for example if the true voltage is zero, the voltage of $E_O$ may equal three, and if the true voltage is 10, then voltage at $E_O$ will be 15.

Figure 8:
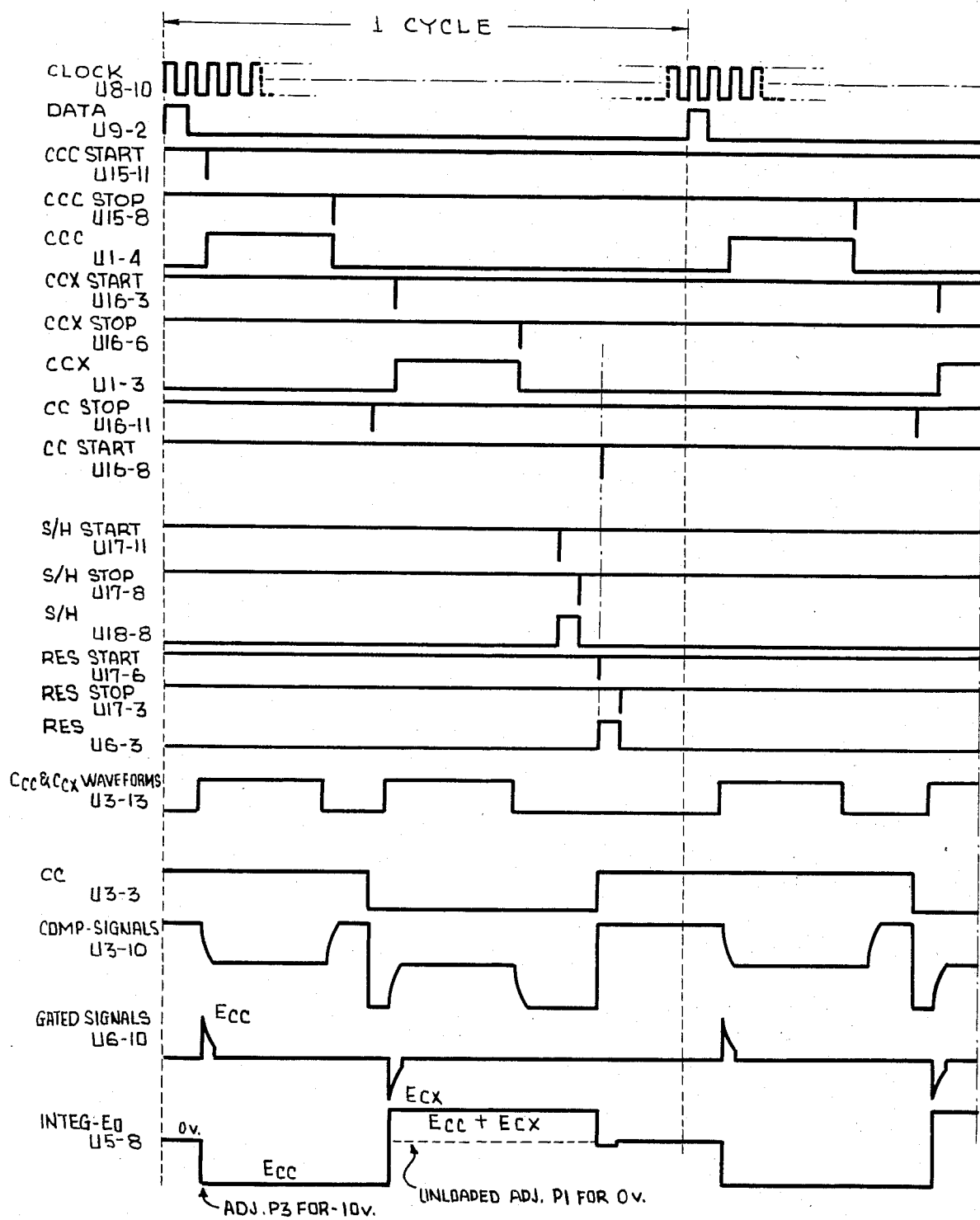
FIG. 8 is a timing diagram showing the operations of various components of the control circuit.

With respect to the timing of the actuation of the various parts of the circuit, reference is made to the timing diagram of FIG. 8. It will be seen that one cycle will constitute twenty-five pulses of the clock 46.

It will be seen that the pulser 48 will receive at terminal 2 a 1 ms pulse at the beginning of each cycle.

Next, it will be seen that there will be a start of the ccc pulse at 2 ms at terminal 11 of NAND gate U15. The ccc pulse will continue until the 8 ms stage and a stop pulse is applied to terminal 8 of the NAND gate U15.

The ccx pulse is started by the application of a pulse to terminal 3 of the NAND gate U16. The pulse ccx runs from the 11 ms time to the 17 ms time, at which time it is disconnected by the application of a stop signal to terminal 6 of the NAND gate U16.

The cc pulse is controlled by a stop signal to terminal 11 of the NAND gate U16 at the 10 ms stage, and a start signal to terminal 8 of NAND gate U16 at the 21 ms stage. It is thus seen that the cc signal is active from zero to 10 ms and from 21 ms to 25 ms.

The S/H signal is started at 19 ms by a control signal to terminal 11 of NAND gate U17 and is terminated at 20 ms by a stop signal to terminal 8 of NAND gate U17. Thus, the S/H signal has a 19 ms delay and 1 ms pulse.

The RESET signal is started at 21 ms by a signal to terminal 6 of NAND gate U17 and is stopped by a signal to terminal 3 of the same NAND gate U17. Thus, the RESET signal has a delay of 21 ms and a 1 ms pulse.

The next line of the timing diagram shows the combined ccc and ccx waveforms.

The next waveform of the timing diagram is that of the previously described cc pulse.

The comparator signal at terminal 10 of the combining gate 78 is next shown, with these signals being controlled by gated signals from terminal 11 of the pulse width gate 80.

Finally, the adjusted pulses from terminal 8 of the integrator 84 is shown with the output being adjusted for −10 volts.

As previously stated, when the control circuit is properly adjusted to provide zero volts output of terminal 8 of the integrator 84, the circuitry is adjusted so that a true reading depends upon the density of containers overlying the sensor S. Further, this true reading of density may be utilized to control the speed of operation of a machine to which containers are being fed.

Although only a preferred embodiment of the density monitor has been specifically illustrated and described herein, it is to be understood that minor variations may be made therein without departing from the spirit and scope of the invention as defined in the appended claims.

We claim:

1. A capacitive article density monitor comprising an elongated sensor, a compensator in the form of a bank of capacitors including a plurality of individual capacitors each having a selector switch, a power supply, a pulsed control unit providing control pulses at different intervals, a first selector gate unit controlled by selected ones of said control pulses to sequentially connect said power supply to said sensor and to said compensator, a second selector gate unit for selecting between the outputs of said sensor and the output of said compensator, and an integrator for receiving the selected outputs of said second selector gate unit for providing a voltage output in accordance with the article density sensed by said sensor.

2. An article density monitor according to claim 1 together with a variable speed drive machine operable at a speed selected in accordance with said voltage output.

3. An article density monitor according to claim 1 together with a pulse width gate positioned intermediate said second selector gate unit and said integrator for controlling the width of a pulse directed to said integrator.

4. An article density monitor according to claim 1 wherein said pulsed control unit includes a clock, and a shift register coupled to said power supply and receiving control pulses from said clock.

5. An article density monitor according to claim 4 wherein said shift register includes serially arranged delays.

6. An article density monitor according to claim 4 wherein said shift register includes serially arranged delays, each coupled to a separate integrator circuit.

7. An article density monitor according to claim 1 wherein said first selector gate unit includes two switches, one of said switches selectively connecting said sensor to said power supply and to ground, and the other of said switches selectively connecting said compensator to said power supply and to ground.

8. An article density monitor according to claim 7 wherein each of said two switches is controlled in timed relation by separate first and second ones of said control pulses.

9. An article density monitor according to claim 8 wherein said second selector gate unit includes a switch having two positions selectively controlled by a third one of said control pulses.

10. An article density monitor according to claim 3 wherein there is a comparator for receiving the output of said second selector gate unit and comparing the same with reference voltages.

11. An article density monitor according to claim 10 wherein said comparator has an output for controlling the position of said pulse width gate.

12. An article density monitor according to claim 10 wherein said comparator includes high and low reference voltage amplifiers connected to said power supply, a further amplifier connected to an output of each of said reference voltage amplifiers and to the output of said second selector gate unit, and a device for controlling pulse width connected to outputs of said further amplifiers and providing a control signal for said control width gate.

13. An article density monitor according to claim 3 wherein intermediate said pulse width gate and said second selector gate there is a differential amplifier coupled to an output of said second selector gate, an inverter coupled to an output of said differential amplifier, and a combining gate coupled to outputs of said differential amplifier and said inverter.

14. An article density monitor according to claim 1 wherein there is a reset gate for said integrator controlled by a further control pulse from said pulsed control unit.

15. An article density monitor according to claim 1 wherein there is a voltage interface coupled to said voltage output and said interface having an output capable of controlling the speed of a variable speed motor.

16. An article density monitor according to claim 1 wherein there is an amperage interface coupled to said voltage output and said interface having an output capable of controlling the speed of a variable speed motor.

17. An article density monitor according to claim 1 wherein there is a density percentage indicator coupled to said voltage output.

18. An article density monitor according to claim 1 wherein there is a multiple bit interface coupled to said voltage output for providing a plurality of preselected motor speeds.

19. An article density monitor according to claim 1 wherein in the absence of articles adjacent said sensor, said capacitors of said bank of capacitors are selected wherein said voltage output is zero.

20. An article density monitor according to claim 1 wherein said sensor is an elongated sensor seated in a can conveyor chute leading to an operating machine having a variable speed drive, and said output voltage is coupled to said variable speed drive for automatically varying the speed of said machine.

21. An article density monitor according to claim 20 wherein said variable speed drive drives said machine at a preselected minimum speed when said output voltage is zero.

22. An article density monitor according to claim 20 wherein said can conveyor chute includes longitudinally spaced transversely extending collars, each of said collars has a lower portion, said elongated sensor being a channel shaped member including a web and depending flanges, said flanges being notched in accordance with the positions of said collars to clear said collars with said web overlying said channel lower portions, and said web being secured to said channel lower portions in insulated relation with said web directly underlying the path of cans rolling down said conveyor chute.

* * * * *